A. P. SMITH.
Pneumatic Churn.
No. 47,607. Patented May 2, 1865.
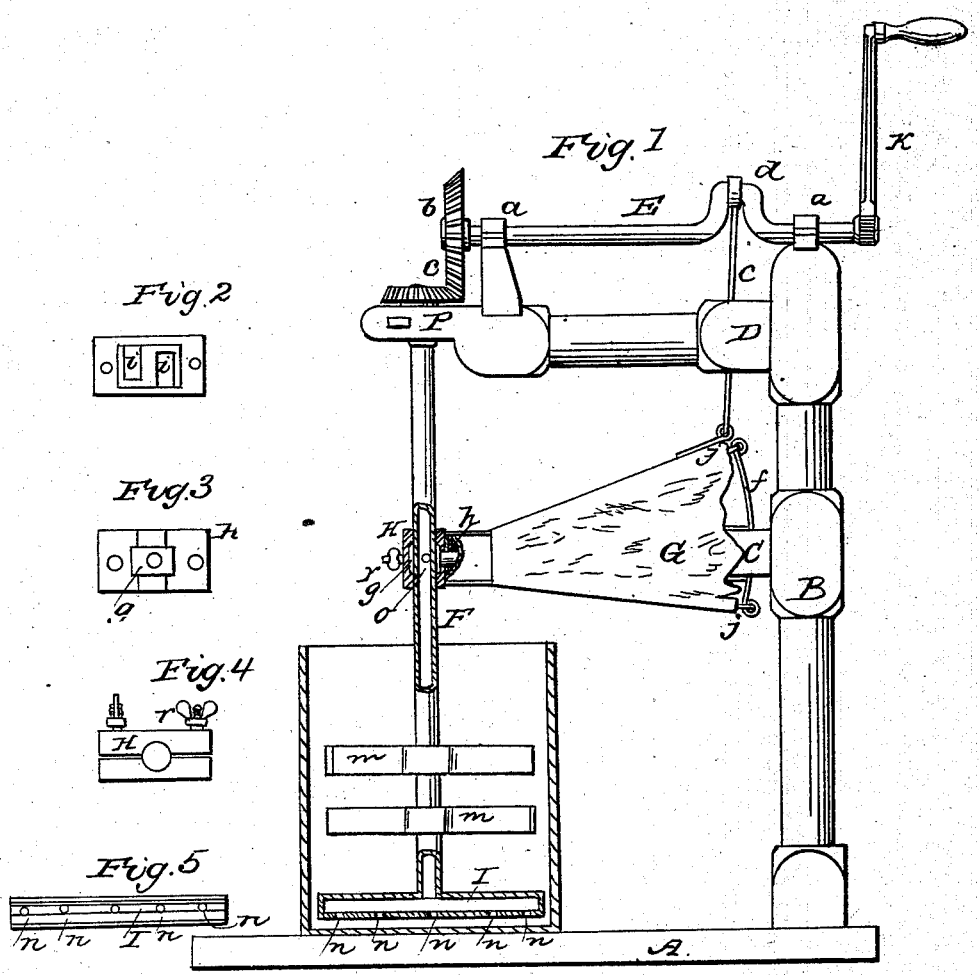

UNITED STATES PATENT OFFICE.

ABBIE J. SMITH, OF LITCHFIELD, CONNECTICUT, ADMINISTRATRIX OF THE ESTATE OF ANDREW P. SMITH.

IMPROVEMENT IN PNEUMATIC CHURNS.

Specification forming part of Letters Patent No. 47,607, dated May 2, 1865.

*To all whom it may concern:*

Be it known that I, ABBIE J. SMITH, (administratrix of the estate of ANDREW P. SMITH, deceased,) of the town and county of Litchfield, in the State of Connecticut, declare that the said ANDREW P. SMITH did invent certain new and useful Improvements in Machinery for Making Butter, called "Smith's Pneumatic Churn;" and I do hereby declare the following is a full, clear, and exact description of the same, reference being had to the accompanying drawings, making a part of this specification, in which—

Figure 1 represents a side elevation of the entire apparatus. Fig. 2 shows the internal valves and box at the small end of the bellows. Fig. 3 shows a section of the box in which the vertical tube-shaft runs and the air-chamber connected with it. Fig. 4 is an edge view of the same. Fig. 5 shows the under side of the hollow horizontal tube for distributing the air forced into the cream at the bottom of the churn by the action of the bellows.

The object of the invention is to furnish an efficient atmospheric or pneumatic churn.

The invention consists in the application of double-acting bellows, operated by a crank and pitman connected with the driving-shaft, in combination with a hollow vertical shaft, which receives the wind from the bellows and forces it down into the cream, and distributes it through a series of small openings in the under side of a tube placed centrally on the vertical hollow shaft at a right angle, so that when rotated it forms one of the beaters to agitate the cream, as well as distribute the air among it.

To enabled others skilled in the art to make and use my pneumatic churn, I will describe it more fully, referring to the drawings and to the letters of reference marked thereon.

I make a platform, A, of plank of suitable size for convenience, on one end of which I place a post or standard, B, into which I frame two arms, C and D, to which all the working parts of the churn are attached. To the lap-arm D and the post B the supports and bearing for the journal-boxes $a\ a$, in which the crank-shaft E turns, which gives motion to the vertical hollow shaft F by means of bevel gear-wheels $b\ c$, and also work the bellows G by means of the crank $a$ and the pitman $e$, the lower arm, $c$, being so shaped as to form the middle part or division of the double-acting bellows G and also the lower support and journal-box H for the vertical shaft F to run in. In the end of the bellows next to the shaft is a recess, $h$, in which are placed two valves, $i\ i$, which open and close alternately with the motion of the bellows. The upper and under boards, $j\ j$, being connected together by a rod, $f$, so that while the one is drawing in the atmospheric air the other is forcing it into the hollow shaft F through the small holes $o\ o$, which are surrounded by an air-chamber, $g$, in the journal-boxes H, so that a continuous current of air is being conveyed down through the hollow vertical shaft F into the horizontal tube I, and is forced out through the small openings $n\ n\ n$ in the under side of the tube into the milk or cream, and is distributed pretty uniformly and copiously among the fluids, causing a great commotion among the particles or globules of which cream is composed, so that the air from below and the beaters $m\ m$ above, acting on the milk or cream in its ebullition state, produces the most extraordinary effect in churning butter. Any kind of a tube or earthen jar may be used for the purpose of holding the milk or cream to be operated on by the above-described mechanism, the vertical shaft and beaters being easily taken off the same by removing the key P and the thumb-nuts $r\ r$, when it can be placed in a stone pot or tub with the cream in, placed in its proper bearings and secured there by the thumb-nuts and key, and it is ready for operation, which is simply turning the crank K, and the butter will be produced in an almost incredible short space of time.

I am aware that atmospheric air has been used as an agitator of milk or cream, and many devices applied for that purpose in the construction of churns, but nothing that has ever come to my knowledge produces so favorable results as the arrangements of the mechanism above described—its operation being easy, its action sure, and effect satisfactory to all.

Having thus fully described the invention, what I claim as new, and desire to secure by Letters Patent, is—

1. The double-action bellows operated by a crank and pitman from the driving-shaft, (the vertical rotating hollow shaft,) having holes in its lower bearing to receive the wind from the bellows and distribute it in the cream in the manner herein described.

2. The valves $i$ $i$ in the recess $h$ and the air-chamber $g$, in combination with the induction-holes $o$ $o$ in the bearing of the hollow shaft F, for the purposes set forth.

3. The horizontal air-tube I with its openings $n$ $n$, in combination with the beaters $m$ $m$, operating in the manner herein described, for the purposes specified.

ABBIE J. SMITH,
*Administratrix of the estate of Andrew P. Smith.*

Witnesses:
T. LEANDER JENNINGS,
CHESTER Y. SMITH.